July 6, 1965   J. W. HICKS, JR., ETAL   3,193,363
LIGHT-CONDUCTING DEVICES AND APPARATUS FOR MAKING THE SAME
Filed Jan. 15, 1960   3 Sheets-Sheet 1

INVENTORS
JOHN W. HICKS, JR.
BY HENRY B. COLE

Louis L. Gagnon
ATTORNEY

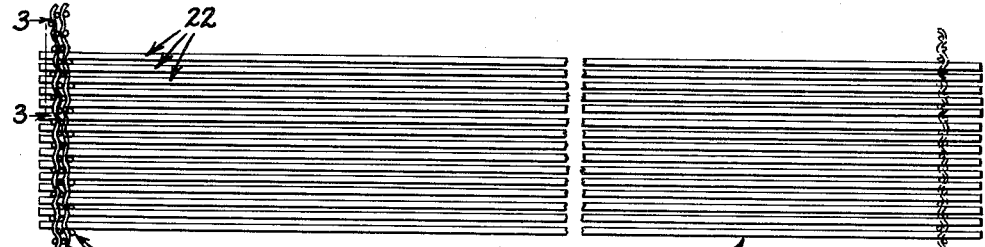
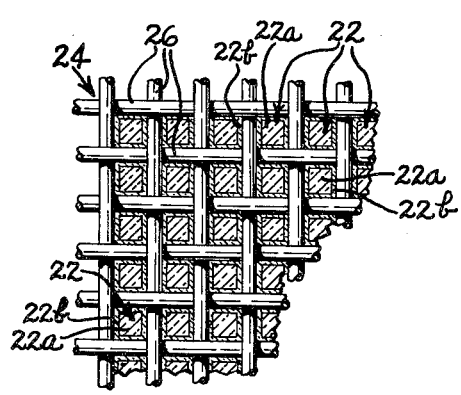
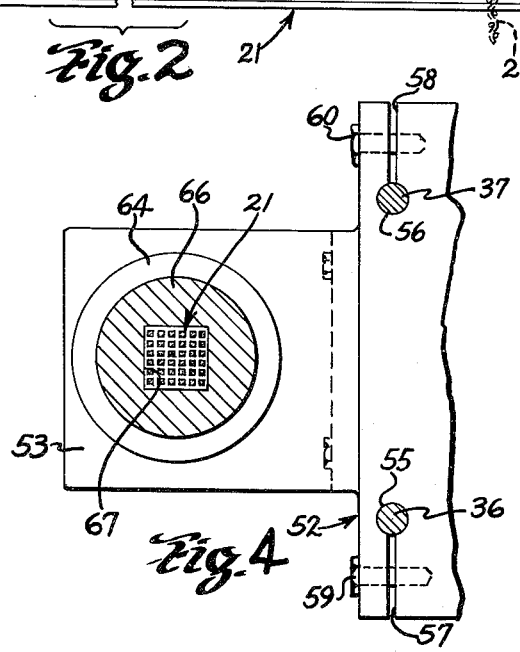
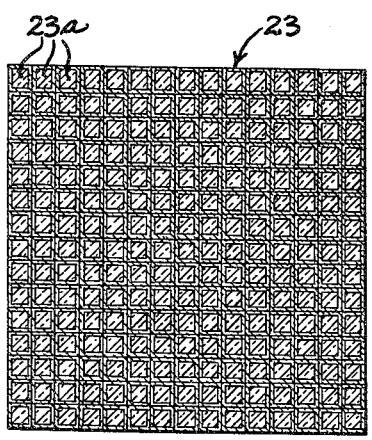
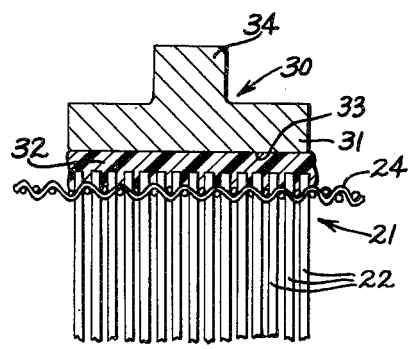
INVENTORS
JOHN W. HICKS, JR.
BY HENRY B. COLE
ATTORNEY

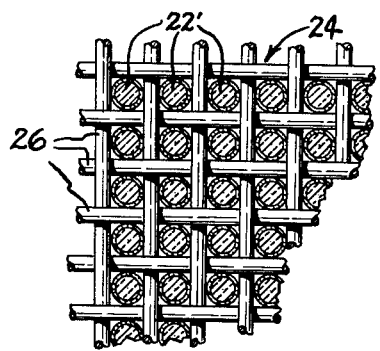
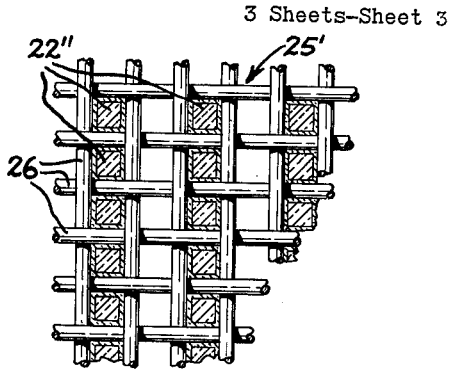
Fig. 7
Fig. 8
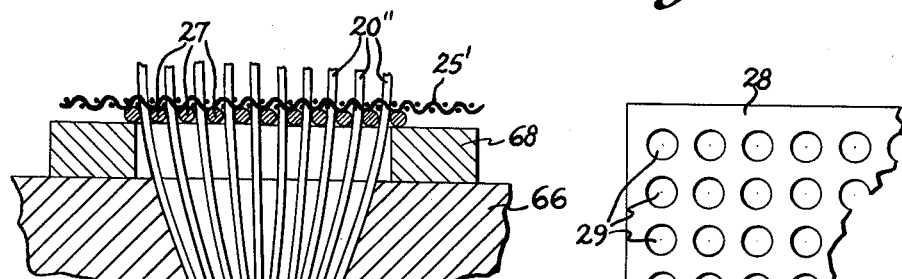
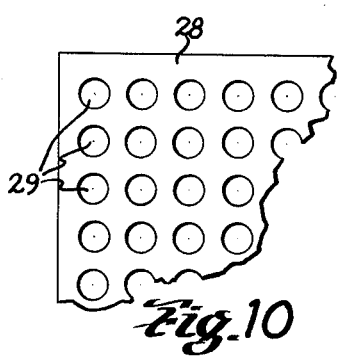
Fig. 9
Fig. 10
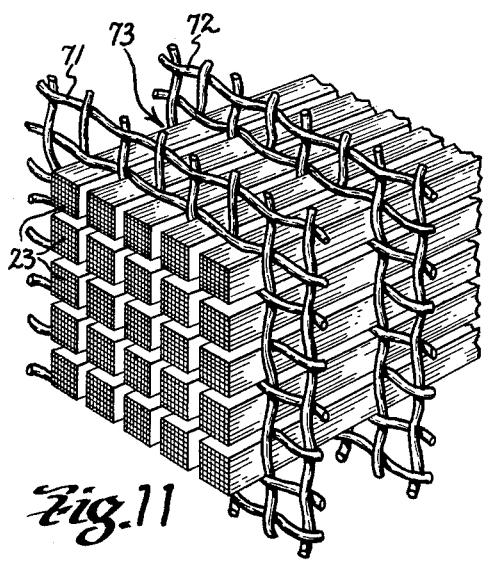
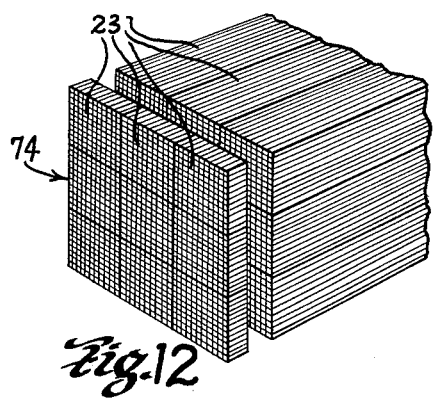
Fig. 11
Fig. 12
INVENTORS
JOHN W. HICKS, JR.
HENRY B. COLE
BY
ATTORNEY a
United States Patent Office
3,193,363
Patented July 6, 1965

3,193,363
LIGHT-CONDUCTING DEVICES AND APPARATUS
FOR MAKING THE SAME
John W. Hicks, Jr., Fiskdale, Mass., and Henry B. Cole,
East Woodstock, Conn., assignors to American Optical
Company, Southbridge, Mass., a voluntary association
of Massachusetts
Filed Jan. 15, 1960, Ser. No. 2,770
11 Claims. (Cl. 65—4)

This invention relates to improved method and apparatus for the manufacturing of a flexible bundle of light-conducting fibers and has particular reference to the making of a bundle of fibers of the type which results in a multiplicity of individual light-conducting channels extending from end-to-end therethrough.

Light-conducting fibers of the above type are generally formed from an array of individual substantially uniformly dimensioned rods of light-conducting material which are grouped in side-by-side relation with each other and together heated and drawn endwise into a desired flexible fiber bundle size whereupon the individual rods of the array become integrally fused together as a single multi-element fiber bundle of reduced cross-sectional size. The rods of the initial group are, in most instances, each provided with a thin outer jacket or cladding of light-insulating material which acts to prevent leakage or "cross talk" of light from one fiber to another in the finished drawn bundle.

In the drawing of a multiple filament bundle to the ultimate cross-sectional size desired, difficulty has been experienced heretofore in avoiding uneven attenuation of the various elements of the bundle and, further, in avoiding the entrapment of air or gases in the finished bundle of fibers when the material of the filaments is heated to fusible temperatures and drawn to the size desired.

One technique used heretofore in the forming of a multi-element bundle of fibers of the above-mentioned character has been to first align the rods of a group to be drawn, as accurately as possible, in side-by-side relation with each other and to thereafter lightly fuse the rods together to prevent relative slippage therebetween when the group is drawn. The pre-fusing of the elements of the group avoids, to some extent, uneven attenuation of said elements during the drawing of a bundle of fibers therefrom but, at the same time, encloses air spaces between the elements which often do not become completely outgassed when the bundle is drawn to the ultimate size. Entrapped air or gas bubbles in the structure of the finished bundle of fibers are objectionable for obvious reasons and the above-described process leaves much to be desired in this respect. Furthermore, the aligning of the elements prior to the pre-fusing operation is time-consuming and difficult to perform, particularly when dealing with a group of relatively small rods.

Another approach to the forming of a multi-element bundle of fibers has been to tightly pack a plurality of relatively small rods or light conducting elements within a tubular jacket of a material capable of being fused to and drawn along with the rods or elements. In this way, the tubular jacket acts to support the elements during the fiber drawing process and air or gases may be evacuated from within the jacket so as to produce a relatively high quality bundle of fibers. However, since the supporting jacket is drawn along with the elements of the bundle, the resultant bundle of fibers, naturally, embodies an outer surrounding jacket in addition to the individual claddings of the elements themselves within this outer jacket. In most cases, the outer surrounding jacket serves no useful purpose in fiber optical devices constructed of multi-element fibers. Actually, it is space-consuming and often detrimental in instances where multi-element fibers are combined to form an image or light-transferring device. In fiber optical devices built up of a multiplicity of fibers placed in side-by-side relation with each other, the material of the jackets increases the overall cross-sectional size of the devices and, in many cases, permits unwanted light to scatter through the jackets from one end of the device to the other.

It will become apparent hereinafter that the present invention provides means and methods for overcoming the above-mentioned problems and other shortcomings of the techniques used heretofore in the forming of multi-element light-conducting fibers and/or devices fabricated therefrom.

Accordingly, a principal object of this invention is to provide improved, simple and highly efficient means and method for forming light-conducting fibers or devices of the type embodying a multiplicity of light-conducting channels extending from end-to-end therethrough.

Another object is to provide an improved method of forming multi-element fibers of the above character which embodies the steps of grouping and supporting a multiplicity of individual rods of light-conducting material initially in spaced substantially parallel aligned relation with each other, progressively urging said rods into converging firm side-by-side engaging relation with each other throughout a relatively short section thereof adjacent one end of said grouping while heating said end of said grouping to a fiber-drawing viscosity and continously drawing the rods thereof, together as a unit, from said end at a controlled rate to form a composite single bundle of fibers therefrom.

Another object is to provide novel means for supporting said grouping of individual rods in said above-mentioned spaced parallel aligned relation with each other and for progressively urging said rods into side-by-side engaging relation with each other as set forth above.

Another object is to provide a natural escape space between each of the rods of the above-mentioned grouping thereof for permitting a substantially complete outgassing to take place between said rods immediately prior to their fusion with each other when drawn, as a unit, to a bundle of desired utimate cross-sectional size.

Another object is to provide, by the method and apparatus set forth above, a simplified and improved process by which multi-element fibers or similar devices may be manufactured with greater efficiency, economy and precision.

Other objects and advantages of the invention will become apparent from the following description when taken in conjunction with the accompanying drawings in which:

FIG. 2 is a diagrammatic fragmentary side elevational view of a group of light-conducting rods which have been aligned and supported in accordance with a step in the method of the invention;

FIG. 3 is a greatly enlarged fragmentary cross-sectional view taken substantially on line 3—3 of FIG. 2 looking in the direction of the arrows;

FIG. 4 is a cross-sectional view taken substantially on line 4—4 of FIG. 1;

FIG. 5 is a greatly enlarged horizontal sectional view taken on line 5—5 of FIG. 1 looking in the direction of the arrows;

FIG. 6 is an enlarged cross-sectional view taken substantially on line 6—6 of FIG. 1 looking in the direction of the arrows;

FIGS. 7 and 8 are greatly enlarged fragmentary cross-sectional views similar to FIG. 3 which illustrate modified alignment patterns and/or types of rods which may be used in accordance with the method of the invention;

FIG. 9 is an enlarged fragmentary vertical cross-sectional view of an assembly of rods which have been aligned as shown in FIG. 8;

FIG 10 is a fragmentary plan view of modified means which may be used to support and align light-conducting rods in accordance with the invention;

FIG. 11 is a diagrammatic illustration of a fiber-redrawing operation which may be performed in accordance with the invention; and FIG. 12 is an enlarged perspective view illustrating one form of light-transferring device which may be constructed of a multiplicity of bundles of light-conducting fibers which are formed in accordance with the invention.

Figure 1:
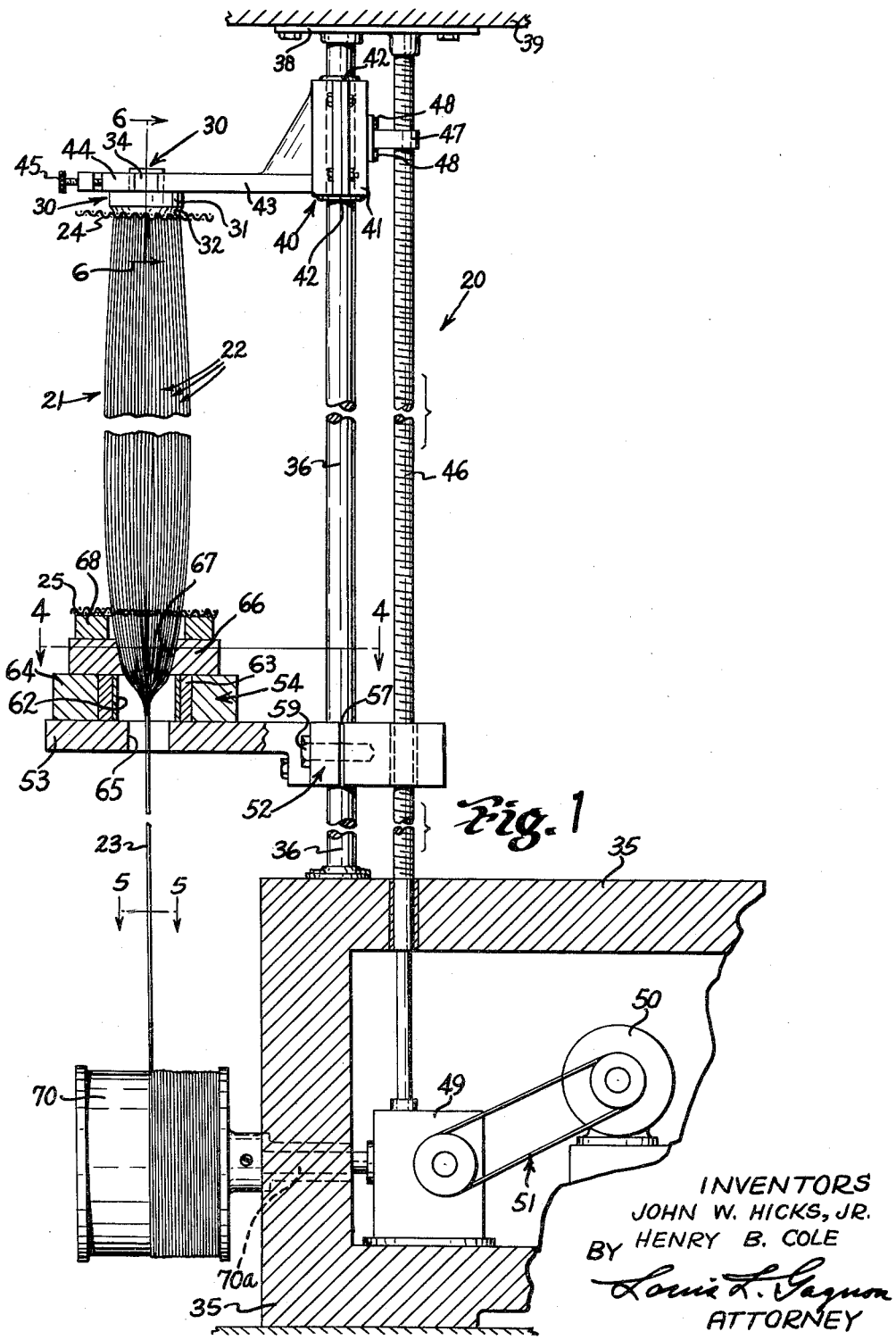
FIG. 1 is a diagrammatic side elevational view partially in cross-section, which illustrates a preferred form of apparatus for carrying out the method of the invention.

Referring more particularly to the drawings wherein like characters of reference designate like parts throughout the various views, there is shown in FIG. 1, apparatus 20 in which an assembly 21 of a plurality of light-conducting rods 22 is supported and drawn into a single multiple fiber bundle 23 of desired cross-sectional size in accordance with the invention.

The rods 22 are preferably of the clad or light-insulated type each embodying a core part 22a of light-conducting material having high internal homogeneity and a relatively high index of refraction such as an optical flint glass or the like of a controlled cross-sectional size and a relatively thin outer jacket or cladding 22b of a material having a relatively low index of refraction such as soda-lime glass or the like of a thickness controlled according to the cross-sectional size of the core tightly bonded to the core part 22a, see FIG. 3. The types of materials of the core and cladding parts of the rods 22 and their relative indices of refraction are preselected at the time of the fabrication of the rods 22 so as to provide in the finished fiber bundle 23 of the invention, a plurality of light-conducting channels or elements each having a maximum light aperture angle with a minimum of cladding material therearound. The rods 22 may be fabricated by any of the various known techniques or in a manner such as set forth in a co-pending application Serial No. 754,255 filed August 11, 1958, now U.S. Patent No. 2,980,957 in the name of John W. Hicks, Jr. The actual fabrication of the rods 22 forms no part of the present invention beyond the fact that, for best results in the practice of the invention, the rods 22 should be of high optical quality, as mentioned above, and uniformly dimensioned throughout their lengths for reasons which will become apparent as this description progresses.

It is to be understood that in referring to each of the members 22 as each being a "rod," it is intended to means an elongated relatively thin structure of any desired cross-sectional shape which is relatively rigid at room temperatures but not without some flexibility. For example, a structure approximately 18 inches long and .050 inch in diameter embodying a core part of barium flint glass having an index of refraction of approximately 1.66 and a thin outer cladding of soda lime glass or the like would be referred to herein as a "rod" as contrasted with a much more flexible similar structure having a thinner cross-section. The more flexible and thinner structure will be referred to hereinafter as a fiber.

In preparing the assembly 21 for adaption of the apparatus of FIG. 1, the rods 22 are first cut or selected to be of substantially the same length and thereafter threaded through the interstices of a pair of woven wire screens or the like 24 and 25 which are initially placed in accurate side-by-side relation with each other with their respective interstices substantially coaxial as shown in FIGS. 2 and 3. The screens 24 and 25 are each selected to have a mesh size such as to provide a relatively snug fit between the fibers and their respective interstices without causing displacement or in any way disturbing the initial aligned relationship of the woven wire strands 26 of the screens. The wire strands 26 of screens 24 and 25 are preferably formed of relatively rigid material which is highly resistant to forces tending to bend or buckle the screens while in use and screens having a warp of substantially parallel strands and a right angular weft such as shown in FIG. 3 are preferred since by the insertion of rods such as 22 through the screen interstices as shown in FIG. 3, a relatively accurately controlled square or rectangular assembly 21 can be formed which when subsequently drawn as a unit, will produce a similarly shaped ultimate fused bundle of fibers. That is, the initial shaped controlled outer contour shape of the assembly 21 will determine to some extent the final outer contour shape of the bundle of fibers to be drawn therefrom as will become apparent hereinafter. It is pointed out that, if desired, hexagonal round or other differently shaped rods 22' can be similarly aligned and supported in screens such as 24 and 25 as shown in FIG. 7. The outer diameters of the rods 22' are preferably selected to be of approximately the same dimension as the widths of the respective screen interstices through which they are inserted. Also, an alignment pattern such as shown in FIGS. 8 and 9 may be used to place the rods 22" of the assembly thereof in alternately spaced parallel rows as illustrated. In so doing, reinforcing members 27 or the like (see FIG. 9) may be extended between the parallel rows of rods 22" to lend support to the screen 25' during the subsequent drawing operation which will be described in detail hereinafter.

It should be understood that, if desired, the woven wire screens 24, 25 or 25', may be replaced with rigid plate-like members (see FIG. 10) having apertures 29 therethrough which are controlled in size to relatively intimately receive the rods in prearranged patterns in accordance with the particular alignment pattern desired of the rods 22. When using plates such as 28, the rods 22 are simply inserted through the apertures 29 for alignment purposes in a manner similar to the above described alignment of the rods 22 in the interstices of the screens 24, 25 or 25'.

Referring once again to FIG. 2 which illustrates diagrammatically the initial steps in the forming of an aligned assembly 21 of glass rods 22, it can be seen that after a preselected number of rods 22 have been inserted through the superimposed screens 24 and 25, the screen 25 is moved away from the screen 24 along the rods 22 to a point near the opposite ends of the rods 22 as shown by the dot-dash outline of the screen 25. In moving the screen 25 along the rods 22 while keeping its general plane substantially parallel to that of the screen 24 at all times, a combing of the rods is effected which automatically aligns the rods 22 in spaced substantially parallel relation to each other throughout the length of the assembly 21 and the opposite ends of the rods 22 of the assembly 21 become substantially identically geometrically patterned.

An adaptor 30 (see FIGS. 1 and 6) is next applied to the end of the assembly 21 adjacent the screen 24 to hold the rods 22 thereof in the above mentioned aligned relation with each other and to provide means by which the assembly can be suspended vertically in the apparatus 20 of FIG. 1 for the drawing of a single multiple fiber bundle 23 therefrom. The adaptor 30 embodies an enlarged body part 31 which may be circular, rectangular, square or other outer contour but of a size such as to completely overlie the end of the assembly 21 to which it is attached with a suitable blocking material such as pitch or an epoxy resin or the like 32 as shown in FIG. 6. In attaching the adaptor 30 to the assembly 21 of rods 22, the blocking material 32, when in a softened state, is preferably allowed to flow in between and around the ends of rods 22 which protrude outwardly of the screen 24 so as to provide a secure bond, when hardened, between the rods 22 and the mounting face 33 of the adaptor while at the same time adhering to the screen 24 to hold it securely in place as shown in FIGS. 1 and 6. The adaptor 30 is provided with a reduced or necked down shank part 34 by means of which the assembly 21 of rods 22 is attached to the fiber drawing apparatus 20.

The apparatus 20 embodies a base 35 on which is mounted a pair of vertically extending parallel columns 36 and 37 each of uniform cross-sectional size throughout the length thereof (see FIGS. 1 and 4) and having the uppermost ends thereof secured within an upper stationary mounting plate 38 which is in fixed prealigned relation with the base 35. The plate 38 may be fastened to the ceiling 39 of a room in which the apparatus 20 is used or, if desired, suitable supporting brackets, not shown, may be extended from the base 35 to the plate 38 to support the uppermost ends of the columns 36 and 37.

In either case, the columns 36 and 37 are permanently held vertically in fixed parallel relation with each other to provide means by which a slide 40 may be accurately guided along a vertical path toward or away from the base 35. The slide 40 embodies an enlarged body section 41 which is fitted around the column 36 as shown in FIG. 1 and is preferably provided with a tubular bushing 42 or other similar bearing means commonly used in such constructions to provide the slide 40 with an accurate sliding fit on the column 36.

Extending forwardly and horizontally from the section 41 and formed as an integral part of the slide 40, there is provided an arm 43 having a clamp 44 at its outer end in which the shank 34 of the adaptor 30 is secured by operation of a thumb screw or the like 45 to suspend the assembly 21 of rods 22 vertically in the apparatus 20 as shown in FIG. 1. In order to move the slide 40 along the columns 36 and 37 so as to automatically lower the assembly of rods 21 toward the base 35 during the drawing of the single multiple fiber bundle 23, a rotatable lead screw 46 is extended vertically from the base 35 through a threaded lug 47 fastened rearwardly on the slide 40 by bolts 48 or the like. The upper end of the lead screw 46 is journalled for rotation in the above mentioned mounting plate 38 and is rotatably driven at its lowermost end through conventional reduction gearing in a gear box 49 supported on the base 35. An electric motor 50 or the like is provided to operate the gearing in the box 49 through a conventional belt and pulley drive 51.

At a predetermined location along the columns 36 and 37 between the base 35 and slide 40, there is provided a platform 52 having a forwardly extending inverted L-shaped shelf part 53 bolted or otherwise secured thereto for supporting a cylindrically shaped heating furnace 54 in substantially axially aligned relation with the longitudinal axis of the glass rod assembly 21. The platform 52 is provided with a pair of openings 55 and 56 (see FIG. 4) through which the respective columns 36 and 37 extend thereby rendering the platform adjustable as to its position on the columns 36 and 37 by being adapted to slide therealong. At opposite sides of the platform, slots 58 and 58 are provided which communicate with the respective openings 55 and 56 (see FIG. 4) to provide means for securely clamping the platform 52 to the columns 36 and 37 at a desired location when bolts 59 and 60 (see FIG. 4) are tightened. The tightening of bolts 59 and 60 tend to close the slots 57 and 58 thus securely clamping the platform 52 to the columns 36 and 37. With the slide 40 initially adjacent the upper end of the columns 36 and 37, the platform 52 is clamped to the columns 36 and 37 at a distance below the slide 40 which is somewhat greater than the overall length of the glass rod assembly 21 so as to permit the assembly 21 to be subsequently lowered endwise into the furnace 54 as will be described in greater detail hereinafter.

The furnace 54 basically embodies a cylindrical resistance type electrical heating element 62 of conventional design which is surrounded with a suitable thermal insulating material 63 to confine the major portion of the heat produced by the element 62 within the area which it encircles. An outer supporting ring 64 of metal or the like may be provided as shown in FIG. 1 to lend more support to the furnace structure. The furnace 54 is so located on the shelf 53 as to position its heating element 62 in approximately axially coincident relation with an opening 65 which extends through the shelf 53 and the opening 65 is, in turn, so located in the shelf 53, as to be substantially axially centrally aligned with the axis of the glass assembly 21 when said assembly is suspended from the slide 40 as shown in FIG. 1.

On the furnace 54 and preferably supported mainly by the above-mentioned ring 64, there is provided a block 66 formed of carbon or other suitable material having a tapered central opening 67 therethrough which is contoured substantially similar to the general outer contour shape of the glass rod assembly 21. That is, if the general overall cross-sectional shape of the glass rod assembly 21 is square, a carbon block 66 having a square opening 67 would be used. If, however, a glass rod assembly 21 having a generally rectangular, hexagonal or circular outer cross-sectional shape is to be used, a carbon block 66 having a similar shaped opening 67 will be placed over the furnace 54. The block 66 is further characterized in that its opening 67 is tapered downwardly and inwardly (as viewed in FIG. 1) with its end of smallest dimension adjacent the furnace 54. Moreover, its end of smallest dimension is so controlled in size as to enclose an area substantially equal to the total cross-sectional area of the rods 22 alone. That is, the area which would be occupied by the rods 22 of the assembly 21 if they are placed in direct side-by-side engaging relation with each other and not spaced from each other as by the wire strands of the screens 24 and 25 described above. The uppermost or larger end of the opening 67 is similarly controlled as to size but in this instance, its size is controlled to be equal to or slightly larger than the actual cross-sectional area of the glass rod assembly 21 taken at a location where the rods 22 pass through one or the other of the screens 24 or 25. The block 66 may be of any desired thickness provided the upper and lower ends of the opening 67 are, at all times, controlled in size as just described. The use of thicker blocks would obviously provide an opening having sides which are less severe as to their angle of taper than would be the case where thinner blocks are used.

The block 66 is preferably formed of carbon as mentioned above particularly for the reasons that carbon, being relatively geometrically stable when subjected to high temperatures, will not become appreciably distorted as to size or shape of the opening 67 while in use and, furthermore, the inherent lubricating characteristics of the carbon material will allow the outermost glass rods 22 of the assembly 21 to slide freely along the walls of the opening 67 without sticking thereto or picking up residue from the block 66 when both the rods 22 and block become heated during the forming of a bundle of fibers of reduced size from the glass rod assembly 21. The block 66 is placed in superimposed axially aligned relation with the opening through the heating element 62 so as to be centrally aligned with the axis of the glass rod assembly 21.

On the block 66, there is placed a ring like spacer 68 to provide a stop against which the outer peripheral edges of the screen 25 abut when the glass rod assembly 21 is lowered by the slide 40 into the opening 67 of the block 66 as shown in FIG. 1. This holds the screen stationary at a fixed distance from the furnace 54 and causes the rods 22 to be combed through the screen 25 when forced downwardly into the block 66 as the slide 40 is lowered. While the spacer 68 may be eliminated from the apparatus and the screen 25 permitted to rest on the top of the carbon block 66, it has been found that by providing approximately a 1-inch space between the screen 25 and the carbon block 66, a relatively smooth sliding action between the rods 22 and the block 66 will result since the spacing will permit, by the flexing of the rods 22, a relatively gradual transition between the straight downward travel of the rods 22 and the inwardly directed path of travel of said rods caused by the taper of the opening 67. It will be noted that, as shown in FIG. 1, a slight outward bowing of the rods 22 will take place throughout the length of the assembly 21 when the rods are forced into the tapered opening 67 to further avoid a sharp bending of the rods 22 in the block 66.

With the above described apparatus, the single multiple fiber bundle 23 is drawn from the glass rod assembly 21 by lowering the slide 40 at a controlled rate such as to force the rods 22 gradually endwise into the tapered opening 67 substantially as illustrated. In so doing, the rods 22 will be forced into firm engaging inclined relation with each other by the tapered opening 67 while being combed through the screen 25 which is supported close enough to the block 66 to maintain the initial aligned relationship of said rods 22 at their point of contact with each other in the block 66. In so doing, a springing together of the rods 22 is accomplished which, when the rods 22 enter the furnace 54 through the lowermost end of the opening 67, causes a tight packing of the assembly and assures a complete and substantially perfect interfacial fusion of the adjoining sides of the rods 22. The heat produced by the element 62 in the furnace is, of course, controlled to heat soften the rods 22 sufficiently for fusion with each other. It is pointed out that the above mentioned springing together of the rods is a result of their inherent tendency to remain straight as they come into contact with each other and by virtue of the fact that they are so tightly compacted and forced together upon entering the furnace 54 they will, upon being heat softened by the furnace, literally flow into intimate side-by-side engaging relation with each other leaving no air spaces therebetween regardless of the initial cross-sectional contour shape of the individual rods themselves. That is, square, hexagonal or round rods 22 will all assume this condition and the outer contour shape of the assembly as a whole will assume substantially the shape of the lowermost end of the opening 67.

As stated above, in passing through the carbon block 66, the rods 22 become inclined relative to each other toward a central axis through the block thereby providing a natural escape space for air or other gases and furthermore by the above mentioned springing action, all air or gas between the rods 22 is actually squeezed upwardly and out from between the rods 22 to provide a clean and smooth interfacial fusion between each adjoining rod.

The glass fusing temperature in the furnace 54 is maintained (by conventional heat control means not shown) such as to render the end of the assembly 22 in the furnace suitably viscous for drawing. For example, with the rods formed of the above discussed combinations of flint and soda lime glasses, a temperature of approximately 1300° F. would be satisfactory.

The drawing of a single multiple fiber bundle 23 from the heated end of the glass rod assembly 21 is accomplished by gripping the heated end of the assembly 21 and drawing the material downwardly substantially axially at a predetermined rate in accordance with the size desired of the fiber bundle 23. One method of starting the drawing of a fiber bundle is to insert a solid rod or the like of glass upwardly through the opening 65 in the shelf 53 into end contact with the heated assembly 21 whereupon it will fuse to the assembly 21. When the solid rod and the assembly 21 have become well fused together, the rod is withdrawn from the furnace 54 carrying with it the material of the assembly 21 in the form of a single multiple fiber bundle 23. The rod is then flame cut or broken or otherwise separated from the bundle 23 and the bundle is thereafter continuously drawn at a precontrolled rate in accordance with the ultimate cross-sectional size desired of the bundle 23 while the assembly 21 is continuously lowered into the furnace 54 through the screen 25 and block 66 at a slower rate controlled in accordance with the rate of removal of the material of the assembly 21 by the drawing of the bundle 23.

A rotatable drum 70 such as shown in FIG. 1 may be provided on the base 35 of the apparatus 20 to receive the bundle 23. With the end of the bundle 23 attached to the drum 70 and the drum rotated at a constant precontrolled rate in accordance with its diameter, a specific uniform size of the fiber bundle 23 can be maintained throughout an extended length while the bundle of fibers 23 is simultaneously wound on the drum. The drum 70 is mounted on a shaft 70a and driven by the motor 50 through conventional gearing (not shown) in the gear box 49.

From the above, it can be seen that with the apparatus shown and described, the glass rod assembly 21 is lowered into the furnace 54 by operation of the lead screw 46 and the ultimate single multiple fiber bundle 23 is drawn by the rotatable drum 70 both of which, as diagrammatically shown, are operated by a motor 50 through gearing in a gear box 49. It is to be understood that said gearing is, by conventional design, such as to rotate the lead screw 46 relatively slowly and the drum 70 relatively rapidly. For example in certain fiber drawing operations, the differential or ratio between the rapid rate at which the fiber bundle 23 is drawn and the slower rate at which the assembly 21 is lowered might be in the order of 460 to 1. In all cases, the glass rod assembly is lowered into the furnace at a rate controlled in accordance with the rate of removal of the material of the assembly 21 by the drawing of the fiber bundle 23 therefrom.

The above described fiber drawing operation is continued until the material of the assembly 21 is nearly exhausted or until the screen 24 is lowered to the point where it eventually engages the screen 25. At this point the remaining portion of the assembly 21 is removed from the apparatus 20 and the process is started anew.

It is pointed out that even though the fiber bundle 23 may be extremely small in cross-sectional size, it will retain substantially the same geometrical pattern as the glass rod assembly from which it was formed, see FIG. 5. That is, in cross section, the elements 23a of the fiber bundle 23 will be substantially identical in geometrical pattern to the pattern of the respective rods 22 of the assembly 21. Moreover the relative core to cladding thicknesses of the respective parts of each of the rods 22 will be automatically substantially reproduced proportionately in the elements 23a of the fiber bundle 23. Thus, control of the size, and geometrical pattern of the elements 23a of a fiber bundle 23, regardless of its reduced size, can be accomplished simply by control of the size and pattern of the rods 22 in the assembly 21 to be drawn and the outer contour shape of the fiber bundle 23 will assume substantially the shape of the opening 67 in the carbon block 66.

Although it is possible, by one single fiber drawing operation such as described above, to form a single multiple fiber bundle 23 as small or smaller than .040 of an inch in diameter from an assembly of 400 rods ⅛-inch in diameter, for example, it may be desirable to redraw said fiber bundle 23 so as to further reduce the cross-sectional size of the individual elements 23a thereof.

In redrawing operations, the fiber bundle 23 is simply cut into predetermined substantially equal lengths and threaded through screens 71 and 72 of preselected mesh size (FIG. 11) to form an assembly 73 similar in all respects to the above described glass rod assembly 21. The drawing of another single multiple fiber bundle from the assembly 73 is accomplished in a manner identical to the above described drawing of the original multiple fiber bundle 23 and any number of redrawing operations may be similarly performed to reduce the size of the individual light-conducting elements of the finally drawn fiber to a practical minimum.

Because of the fact that the initial geometrical cross-sectional pattern of the assembly 21 of rods 22 is relatively accurately reproduced throughout the length of the fiber bundle 23 drawn therefrom as described above, the elements 23a of the fiber bundle 23 are substantially identically geometrically patterned at all cross-sections through the bundle 23 and the bundle 23 will provide ideal optical image transferring means regardless of the length to which it is cut. That is, optical images introduced at one end of a fiber bundle such as 23 of any desired length will be transferred by internal reflections through each of the elements 23a and reproduced accurately in form at the opposite end of the fiber bundle 23.

Devices such as cathode ray tube faceplates or the like having superior image transferring capabilities can be fabricated from bundles of fibers such as 23 by lightly fusing, cementing or otherwise securing a plurality of said fiber bundles in side-by-side relation with each other as shown in FIG. 12 and thereafter cutting a section such as 74 of predetermined thickness from the assembly. Several sections such as 74 can then be secured together in edge-to-edge relation with each other to form larger image or light transferring face plates or the like.

While the assembly 21 of rods 22 has been shown and described hereinabove as embodying two screens or the like 24 and 25, it should be understood that the uppermost ends of the rods 22 (see FIG. 1) may be simply engaged by an enlarged flat plate-like part similar to the face 33 of the adaptor 30 without the use of the screen 24 or cement 32 once the lowermost ends of the rods 22 have been inserted into the carbon block 66. In this way, the rods 22 will be combed through the screen 25 as they are forced downwardly but will be relatively free to become laterally self-adjusting at their uppermost ends in response to the above-discussed tendency for said rods to bow outwardly as they are progressively lowered into the block 66.

From the foregoing, it will be seen that simple, efficient and economical means and method have been provided for accomplishing all of the objects and advantages of the invention. Nevertheless, it is apparent that many changes in the details of construction, arrangement of parts or steps in the process may be made without departing from the spirit of the invention as expressed in the accompanying claims and the invention is not to be limited to the exact matters shown and described as only the preferred matters have been given by way of illustration.

Having described our invention, we claim:

1. Apparatus of the character described comprising a glass heating furnace having an open-ended heating chamber extending therethrough, means for supporting a plurality of glass rods initially in spaced prearranged geometrical relation with each other, means adjacent said furnace having an opening therethrough in substantially coaxial alignment with said heating chamber through which said assembly of glass rods may be inserted endwise into said heating chamber, said opening being of a controlled size and shape such as to cause said rods to become progressively inclined toward a central axis through said opening and into firm engaging relation with each other when said assembly is pressed endwise through said opening, means for pressing said assembly gradually endwise through said opening and into said heating chamber at a precontrolled rate, means for heating said chamber sufficiently to render the material of said rods fusible and suitably viscous for drawing and means for drawing said assembly longitudinally to a reduced cross-sectional size.

2. Apparatus of the character described comprising a glass heating furnace having an open-ended heating chamber extending therethrough perforate means adjacent one end of said heating chamber said perforate means having a plurality of relatively rigid but resilient and individually bendable glass rods extending therethrough initially in substantially parallel spaced side-by-side relation with each other, rod bending means between said perforate means and said one end of said heating chamber having an opening extending therethrough of a controlled size and shape such to cause said rods to become progressively inclined toward a central axis through said opening and into firm engaging relation with each other when pressed through said opening into said heating chamber, means for pressing said rods progressively endwise through said perforate and bending means into said heating chamber and means for heating said chamber sufficiently to cause said rods to become fuse together as they pass through said heating chamber.

3. Apparatus of the character described for use with a glass heating furnace having an open-ended heating chamber extending therethrough, said apparatus comprising means adapted to be positioned adjacent one side of said furnace having an opening therethrough in substantially coaxial alignment with said heating chamber, a screen-like member adapted to ultimately overlie said opening at the end thereof opposite to said furnace and further adapted to support a plurality of elongated glass rods in spaced adjacent relation with each other when said rods are extending each through one of the interstices of said screen-like member, means for holding said rods initially in such spaced relation with each other, means for gradually forcing said rods endwise through said screen-like member together as a unit into and through said openings and into said heating chamber, said opening being of a controlled size and shape such as to cause said rods to become progressively inclined toward a central axis through said opening and into firm engaging relation with each other when passed therethrough, said heating chamber being adapted to heat said engaging portions of said rods to a temperature sufficient to cause said portions of said rods to fuse to each other and to be rendered suitably viscous for drawing.

4. Apparatus of the character described comprising an elongated guideway, a glass heating furnace having an open-ended heating chamber, means for supporting said furnace at a fixed predetermined distance from one end of said guideway, a slide member carried by said guideway and slidably movable therealong, means to move said slide member toward said furnace, means for supporting a plurality of glass rods initially in spaced relation with each other, means having an opening therethrough in substantially coaxial alignment with said heating chamber for receiving one end of said assembly of glass rods, said opening being gradually inwardly tapering in a direction toward said furnace to cause said rods to become progressively inclined toward a central axis through said opening and into intimately engaging relation with each other when said assembly is forced endwise toward said furnace through said opening, means on said slide member to engage the opposite end of said assembly and force said assembly through said opening into said heating chamber when said slide is moved toward said furnace and means for heating said chamber sufficiently to cause said rods to become joined together by fusion.

5. An apparatus for making a fused energy-conducting device having a multiplicity of individual energy-conducting channels extending from end-to-end therethrough comprising means for supporting an assembly of a plurality of relatively rigid but resilient and individually bendable glass rods in spaced side-by-side prearranged geometrical relation with one another, heating means having a heating zone adapted to heat said rods sufficiently for fusion of one to the other, means adjacent said heating means for bending said rods in a relatively short zone along mutually intersecting inclined engaging paths into intimate side-by-side relationship in said heating zone to fuse said rods so related into a unitary structure and means for pressing said rods endwise progressively through said bending and heating means to effect such bending and fusion of the rods progressively along at least the major portion of the length of said assembly.

6. An apparatus for making a fused energy-conducting device having a multiplicity of individual energy-conducting channels extending from end-to-end therethrough comprising means for supporting an assembly of plurality of relatively rigid but resilient and individually bendable glass rods in spaced side-by-side prearranged geometrical relation with one another, heating means having a heating zone adapted to heat said rods sufficiently for fusion of one to the other, means adjacent said heating means for bending said rods in a relatively short zone along mutually intersecting inclined engaging paths into intimate side-by-side relationship in said heating zone to fuse said rods so related into a unitary structure, means for pressing said rods endwise progressively through said bending and heating means to effect such bending and fusion of the rods progressively along at least the major portion of the length of said assembly, means for withdrawing endwise from said unitary structure a single rod of substantially reduced cross-section containing longitudinal energy-conducting channels representative of each of said rods but of reduced cross section and means for controlling the relative rates of said pressing and withdrawal in accordance with the transverse size desired of said single rod throughout its length.

7. The method of making a fused energy-conducting device having a multiplicity of individually insulated energy-conducting channels extending from end-to-end therethrough comprising the steps of assembling a plurality of fusible relatively rigid but resilient and individually bendable clad rods of energy-conducting material supported initially in spaced side-by-side prearranged geometrical relation with one another, maintaining said relation at a first zone along the length of said rods, pressing said rods endwise along mutually intersecting inclined engaging paths into intimate side-by-side relationship in a heating zone adjacent said first zone and fusing said rods so related into a unitary assembly in said heating zone.

8. The method of making an energy-conducting device having a multiplicity of individually insulated energy-conducting channels extending from end-to-end therethrough comprising the steps of assembling a plurality of fusible relatively rigid but resilient and individually bendable rods of energy-conducting material supported initially in spaced side-by-side prearranged geometrical relation with one another, maintaining said relation at a first zone along the length of said rods, said zone being movable along the length of said rods, pressing said rods along mutually intersecting inclined engaging paths into intimate side-by-side relationship in a heating zone adjacent said first zone, fusing said rods so related into a unitary assembly in said heating zone, withdrawing endwise from said unitary assembly a single rod of reduced cross-section containing longitudinal energy-conducting channels representative of each of said rods but of reduced cross section and pressing said rods endwise into said first zone at a rate related to the rate of withdrawal of said single rod from said unitary assembly in accordance with the cross-sectional size desired of said single rod.

9. The method of making a light-conducting device having a multiplicity of individual light-insulated light-conducting channels extending from end-to-end therethrough, comprising the steps of assembling a plurality of relatively rigid but resilient and individually bendable glass clad glass rods supported initially in spaced side-by-side prearranged geometrical relation with one another; maintaining said relation at a first zone along the length of said rods, said zone being movable along the length of said rods, pressing said rods along mutually intersecting inclined engaging paths into intimate side-by-side relationship in a heating zone immediately following said first zone, fusing said rods so related into a unitary assembly in said heating zone, withdrawing from said heating zone a single rod of greatly reduced cross-section containing longitudinal light-conducting channels representative of each of said rods, but of greatly reduced cross-section, and pressing said rods endwise into said first zone at a rate so related to the rate of withdrawal of said single rod from said heating zone as to maintain the diameter of said single rod constant.

10. The method of making a device having a multiplicity of individually insulated energy-conducting channels extending from end-to-end therethrough for conducting optical energy by the function of internal reflection, comprising the steps of assembling a plurality of relatively rigid but resilient and individually bendable rods supported initially in spaced side-by-side prearranged geometrical relation with one another, said rods each having a core of material of preselected relatively high index of refraction surrounded by a relatively thin cladding of material having a lower index of refraction than said core, maintaining said relationship of said rods at a first zone movable along the length of said rods, pressing said rods along mutually intersecting inclined engaging paths into intimate side-by-side relationship progressively along the length of the assembly thereof in a heating zone adjacent said first zone, fusing said rods so engaged into a unitary assembly in said heating zone, withdrawing from said unitary assembly a single rod of substantially reduced cross-section containing longitudinal energy-conducting channels representative of each of said rods, but of reduced cross-section, and pressing said rods endwise into said first zone at a predetermined rate related to the rate of withdrawal of said single rod from said assembly in accordance with the transverse dimensions desired of said single rod along its length.

11. The method of making a fused optical energy-conducting device having a multiplicity of individually insulated energy-conducting channels extending from end-to-end therethrough for conducting optical energy by the function of internal reflection, said method comprising the steps of assembling a plurality of relatively rigid but resilient and individually bendable rods supported initially in spaced side-by-side prearranged geometrical relation with one another, said rods each having a core of material of preselected relatively high index of refraction surrounded by a relatively thin cladding of material having a lower index of refraction than said core, maintaining said relationship of said rods at a first zone movable along the length of said rods, pressing the assembly of said rods endwise into means adapted to cause bending thereof along mutually intersecting inclined paths to bring said rods progressively into compressive side-by-side relation upon engagement with each other in a second zone adjacent said first zone, fusing said rods so engaged to form a unitary structure thereof, withdrawing endwise from said unitary structure a relatively long and thin section of substantially reduced cross-section containing fused together longitudinal energy-conducting channels representative of each of said rods but of reduced cross-section and controlling the rate of said pressing of said rods relative to the rate of withdrawal of said section in accordance with the cross-sectional size desired of said section.

References Cited by the Examiner
UNITED STATES PATENTS

| | | | |
|---|---|---|---|
| 2,341,615 | 2/44 | Hoffman | 18—8 |
| 2,461,841 | 2/49 | Nordberg | 65—4 |
| 2,551,684 | 5/51 | Lodge | 18—8 |
| 2,752,731 | 7/56 | Altosaar | 65—23 |
| 2,778,763 | 1/57 | Novak | 156—296 |
| 2,938,821 | 5/60 | Nack | 65—4 X |
| 3,004,368 | 10/61 | Hicks | 65—4 |
| 3,034,566 | 5/62 | McKay | 156—296 X |

FOREIGN PATENTS 557,395  5/58  Canada.

DONALL H. SYLVESTER, *Primary Examiner.*

CHARLES R. HODGES, ARTHUR P. KENT, *Examiners.*